United States Patent

Kim

(10) Patent No.: US 7,427,938 B2
(45) Date of Patent: Sep. 23, 2008

(54) RECEIVER AND METHOD THEREOF

(75) Inventor: Yong-Woon Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/331,226

(22) Filed: Jan. 13, 2006

(65) Prior Publication Data

US 2006/0158366 A1   Jul. 20, 2006

(30) Foreign Application Priority Data

Jan. 18, 2005   (KR) .................... 10-2005-0004619

(51) Int. Cl.
*H03M 1/12* (2006.01)
(52) U.S. Cl. ...................... 341/155; 342/451
(58) Field of Classification Search ........... 375/344, 375/297, 355, 148, 222; 342/451; 341/155; 370/476
See application file for complete search history.

(56) References Cited

U.S. PATENT DOCUMENTS

| | | | | |
|---|---|---|---|---|
| 4,568,938 A | * | 2/1986 | Ubriaco | 342/87 |
| 4,775,851 A | * | 10/1988 | Borth | 341/155 |
| 5,619,505 A | * | 4/1997 | Grube et al. | 370/476 |
| 6,275,990 B1 | * | 8/2001 | Dapper et al. | 725/106 |
| 6,353,629 B1 | * | 3/2002 | Pal | 375/222 |
| 6,567,462 B1 | * | 5/2003 | Brunner et al. | 375/148 |
| 6,711,221 B1 | * | 3/2004 | Belotserkovsky et al. | 375/355 |
| 6,759,983 B2 | * | 7/2004 | Eden | 342/451 |
| 2002/0173931 A1 | * | 11/2002 | Dudler et al. | 702/151 |
| 2003/0156658 A1 | * | 8/2003 | Dartois | 375/297 |
| 2004/0161047 A1 | | 8/2004 | Liu et al. | |
| 2004/0161062 A1 | * | 8/2004 | Richey et al. | 375/344 |

FOREIGN PATENT DOCUMENTS

| | | |
|---|---|---|
| JP | 2003-134079 | 5/2003 |
| KR | 1020030090460 A | 11/2003 |

OTHER PUBLICATIONS

Park, Young-seon, Lee, Byeong Gi., "Analysis Of OFDM Frequency Offset Estimation Scheme Using Virtual Carrier And Its Extension To Oversampling Based Estimation", no date.

\* cited by examiner

*Primary Examiner*—Jean B Jeanglaude
(74) *Attorney, Agent, or Firm*—Harness, Dickey & Pierce, P.L.C.

(57) ABSTRACT

A receiver and method thereof. The example receiver may include an analog-to-digital (ADC) converter for performing an over-sampling operation on a received signal to generate output data, the over-sampling operation based on a sampling frequency and an over-sampling coefficient and a fast fourier transform (FFT) calculating unit for performing a FFT on the output data of the ADC converter.

24 Claims, 5 Drawing Sheets

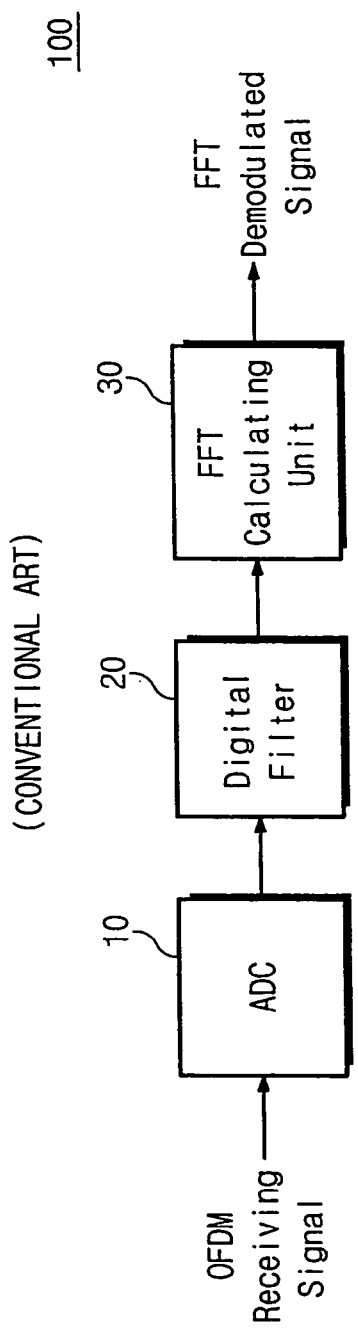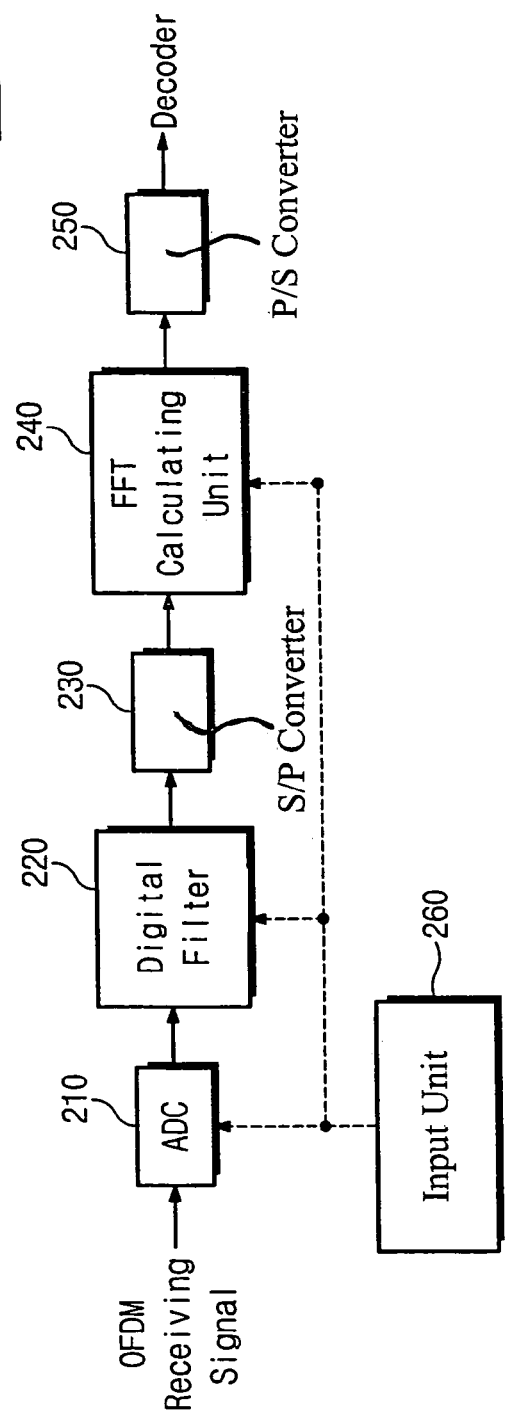

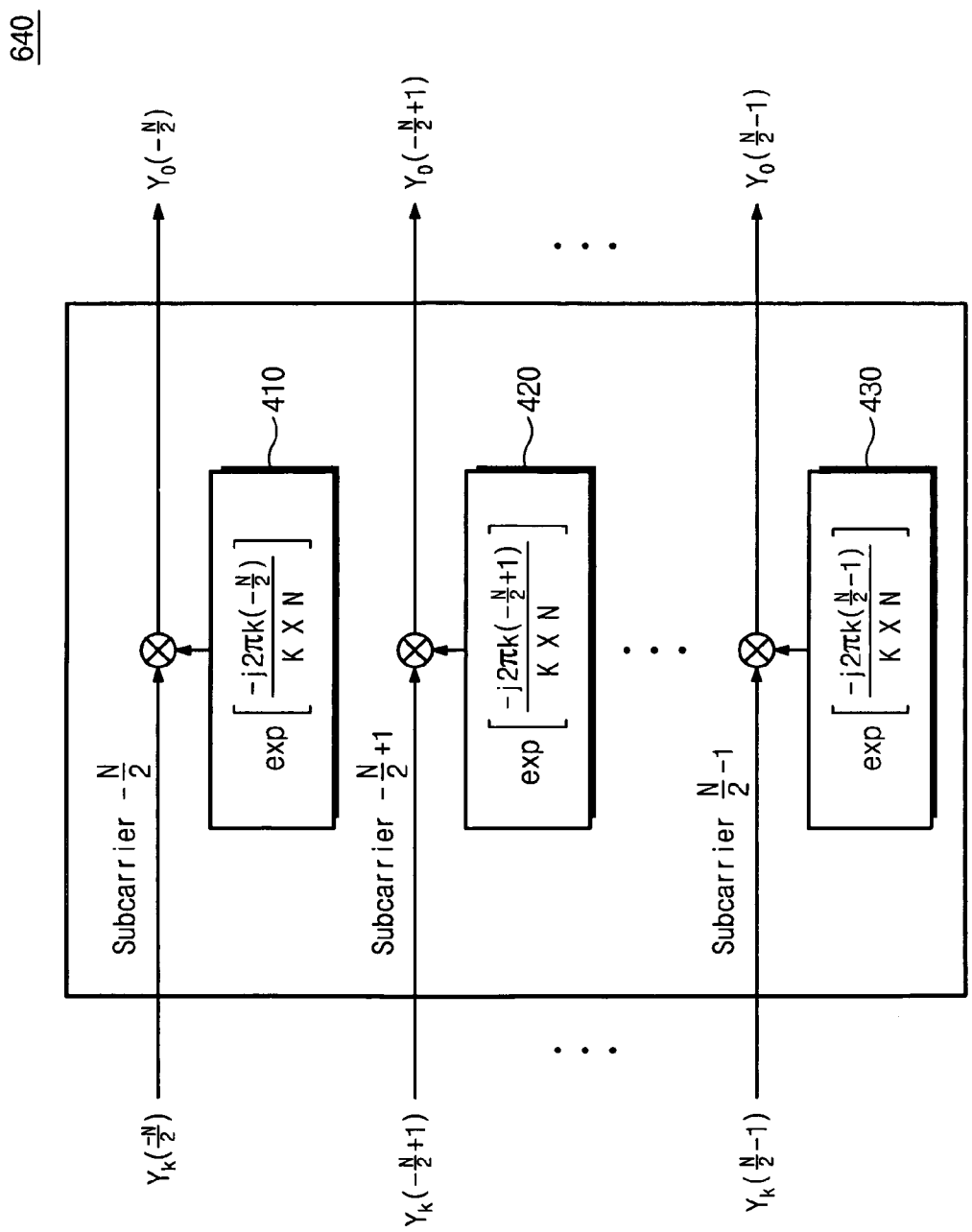

RECEIVER AND METHOD THEREOF

PRIORITY STATEMENT

This application claims priority to Korean Patent Application No. 2005-0004619 filed on Jan. 18, 2005 in the Korean Intellectual Property Office, the entire contents of which are hereby incorporated by reference.

BACKGROUND OF THE INVENTION

1. Field of the Invention

Example embodiments of the present invention relate generally to a receiver and method thereof, and more particularly to a receiver for over-sampling a received signal and method thereof.

2. Description of the Related Art

An orthogonal frequency division multiplexing (OFDM) system may be used to modulate digital signals in accordance with any conventional digital communication standard, such as xDSL, IEEE 802.11, IEEE 802.16, etc. Conventional digital communication standards may use a given number of sub-carrier waves and frequency bands. However, generally, each of the conventional digital communication standards may employ a similar modulation scheme.

In conventional digital modulation, an Inverse Fast Fourier Transform (IFFT)/Fast Fourier Transform (FFT) function block may modulate and demodulate data, respectively. A cyclic prefix may be inserted in a transmitted signal to compensate for impulse response characteristics and/or multi-path fading in a channel so as to reduce intersymbol interference (ISI) and/or inter-channel interference (ICI). Thus, if the impulse response characteristics or delay in a channel is shorter than the cyclic prefix, the ISI may be generated within a given range of the cyclic prefix. Such an ISI may be reduced by removing or reducing the cyclic prefix. However, if the ISI is longer than the range of the cyclic prefix, the ISI and/or the ICI may not be mitigated before a time domain equalization method may be employed, for example, in an asymmetric digital subscriber line (ADSL).

Additive White Gaussian Noise (AWGN) may be included in a channel. An analog low-pass filter (LPF) may be used to suppress the AWGN in the channel. The analog LPF may not be able to completely remove the AWGN from the channel. Thus, a digital filter may be employed for further reducing the AWGN (e.g., portions of the AWGN not removed by the analog LPF or generated after the analog LPF reduces the AWGN). The analog LPF may also be used to reduce an aliasing effect by sampling the multi-carrier wave signal.

A conventional digital filter may not reduce or remove noise in a pass-band of the analog LPF. Furthermore, the conventional digital filter may include a number of delay taps to reduce noise. The delay taps may degrade the impulse response of a channel. Thus, a tradeoff between impulse response degradation and noise reduction may be made by selecting the number of delay taps in the digital filter.

FIG. 1 is a block diagram illustrating a conventional OFDM receiver 100. Referring to FIG. 1, OFDM receiver 100 may include an analog-to-digital converter (ADC) 10, a digital filter 20 and a FFT calculating unit 30 for demodulating an OFDM signal received through a multi-carrier wave signal.

Referring to FIG. 1, an OFDM receiving signal may be an AWGN reduced (e.g., removed) signal. In other words, an input signal of a system may be converted into a baseband signal and the AWGN may be removed/reduced from the baseband signal by the low-pass filter to generate the OFDM receiving signal. The OFDM receiving signal may further be an analog signal after an aliasing effect by the multi-carrier wave may be reduced from the input signal.

Referring to FIG. 1, The ADC 10 may convert the OFDM receiving signal from an analog format into a digital format by sampling the OFDM receiving signal in a given sample period. The given sample period may be a period of a Nyquist frequency.

Referring to FIG. 1, The digital filter 20 may be a digital base-band filter for filtering digital symbols outputted from the ADC 10. The digital filter 20 may reduce noise not previously removed by the analog filter and/or AWGN generated after the analog-to-digital conversion performed by the ADC 10. The digital filter 20 may further reduce quantization noises.

Referring to FIG. 1, the FFT calculating unit 30 may perform an N-point decimation FFT on each of the digital symbols output from the digital filter 20. Thus, the FFT calculating unit 30 may demodulate digital data, where the digital data may be previously modulated by performing an IFFT at a transmitter.

As described above, the OFDM receiver 100 may reduce the AWGN by using the analog low-pass filter and the digital filter in combination so as to improve a signal-to-noise ratio (SNR) of FFT calculation. However, the AWGN may not be fully removed by the above-described conventional process. Furthermore, the digital filter may include a number of delay taps correlating to a level of noise reduction, thereby increasing noise reduction at the expense of degrading an impulse response of a channel.

SUMMARY OF THE INVENTION

An example embodiment of the present invention is directed to a receiver, including an analog-to-digital (ADC) converter for performing an over-sampling operation on a received signal to generate output data, the over-sampling operation based on a sampling frequency and an over-sampling coefficient and a fast fourier transform (FFT) calculating unit for performing a FFT on the output data of the ADC converter.

Another example embodiment of the present invention is directed to a method for receiving data, including over-sampling a received signal based on an over-sampling coefficient and a sampling frequency to generate over-sampled data and performing a fast fourier transform (FFT) on the over-sampled data to generate FFT over-sampled data.

BRIEF DESCRIPTION OF THE DRAWINGS

The accompanying drawings are included to provide a further understanding of example embodiments of the present invention, and are incorporated in and constitute a part of this specification. The drawings illustrate example embodiments of the present invention and, together with the description, serve to explain principles of the present invention.

FIG. 1 is a block diagram illustrating a conventional orthogonal frequency division multiplexing (OFDM) receiver.

FIG. 2 is a block diagram illustrating a receiver according to an example embodiment of the present invention.

FIG. 6 is a block diagram illustrating a FFT calculating unit according to another embodiment of the present invention.

DETAILED DESCRIPTION OF EXAMPLE EMBODIMENTS OF THE INVENTION

Figure 3:
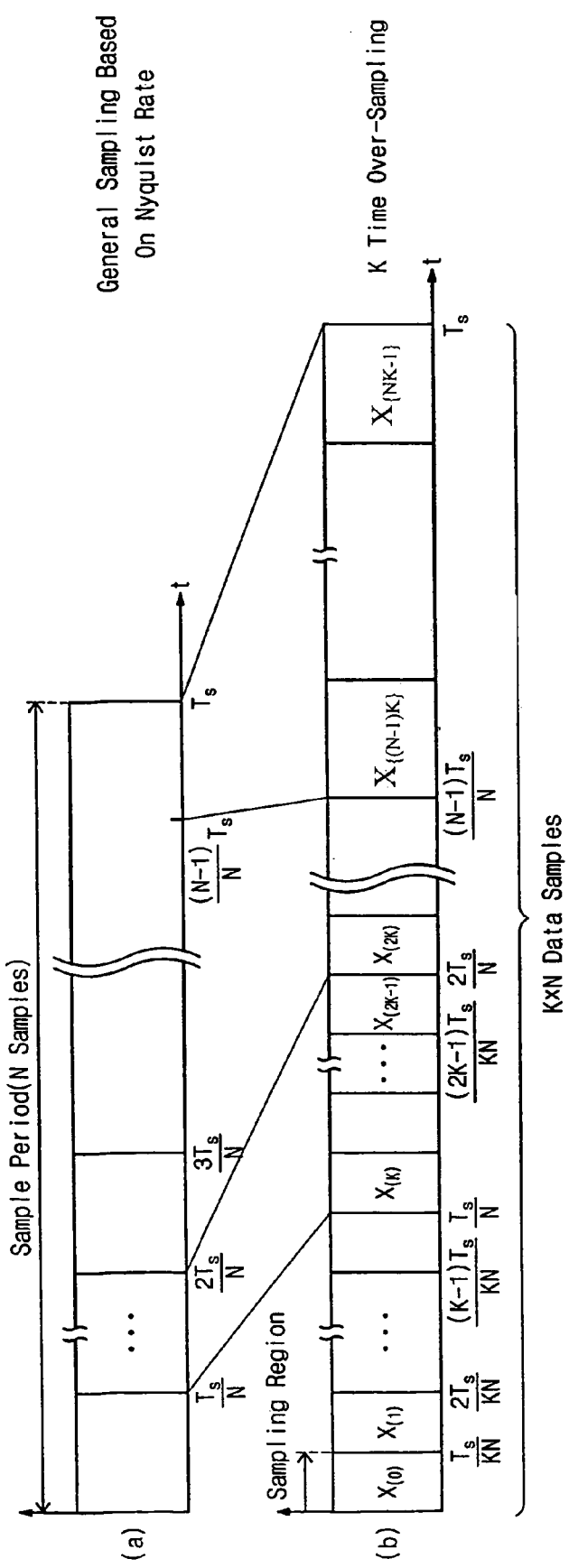
FIG. 3 is a timing diagram illustrating data sequences sampled by the an analog-to-digital (ADC) converter based on a Nyquist frequency rate and an over-sampling coefficient according to another example embodiment of the present invention.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention is susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention is to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 2 is a block diagram illustrating a receiver 200 according to an example embodiment of the present invention.

In the example embodiment of FIG. 2, the receiver 200 may include an analog-to-digital converter (ADC) 210 for converting an OFDM receiving signal from an analog format into a digital format based on an over-sampling frequency. In an example, the over-sampling frequency may be a multiple of a Nyquist frequency. In a further example, the over-sampling frequency may be K times the Nyquist frequency, where K may be an over-sampling coefficient being an integer greater than or equal to 1.

In the example embodiment of FIG. 2, the receiver 200 may further include a digital filter 220 for filtering the over-sampled digital information received from the ADC 210, a serial-to-parallel (S/P) converter 230 for converting serial data (e.g., over the over-sampled signal) to parallel data to perform N-point decimation fast Fourier transform (FFT) calculation, a FFT calculating unit 240 for performing a FFT on received signals, a parallel-to-serial (P/S) converter 250, and an input unit 260 for determining and outputting the over-sampling coefficient K.

In the example embodiment of FIG. 2, the ADC 210 may sample the OFDM receiving signal based on the over-sampling coefficient K received from the input unit 260. Thus, the ADC 210 may sample the OFDM receiving signal K times. The digital filter 220 may filter the over-sampled data received from the ADC 210 based on the over-sampling coefficient K. The serial-to-parallel converter 230 may convert an output data sequence of the digital filter 220 into a parallel format for N-point FFT calculation. The FFT calculating unit 240 may perform a FFT calculation on N×K over-sampled data, with K blocks each having N over-sampled data, and may perform a phase compensation on K output data blocks. After performing the phase compensation, the FFT calculating unit 240 may output N demodulated parallel data. The parallel-to-serial (P/S) converter 250 may convert N parallel data outputted from the FFT calculating unit 240 into serial data, and may output the converted serial data.

In the example embodiment of FIG. 2, a signal-to-noise ratio (SNR) may be increased by over-sampling a received signal because data integrity in the received signal may be increased without a corresponding increase in noise.

In the example embodiment of FIG. 2, the ADC 210 may convert the OFDM receiving signal from an analog format into a digital format based on the over-sampling coefficient K. The ADC 210 may output N×K time domain sample sequences by K times over-sampling the analog OFDM receiving signal for N-point FFT.

In the example embodiment of FIG. 2, the digital filter 220 may reduce (e.g., eliminate) noise (e.g., noise not previously removed by an analog low-pass filter in the receiver 200). The digital filter 220 may also reduce (e.g., eliminate) Additive White Gaussian Noises (AWGN) and/or quantization noises which may be generated after the ADC 210 outputs the over-sampled data (e.g., generated in the ADC 210).

In the example embodiment of FIG. 2, the serial-to-parallel (S/P) converter 230 may re-arrange N×K serial data sequences received from the digital filter 220 to K data blocks, each of the K data blocks having N-point FFT unit blocks. Each N-point FFT block may be output in parallel within a given time interval (e.g., a time interval of data outputted by sampling data based on a Nyquist frequency).

For example, if one symbol period is Ts, each of K data blocks may be representative of time domain data delayed by as much as Ts/(K×N).

In the example embodiment of FIG. 2, the FFT calculating unit 240 may divide N×K sampled data sequences to generate K N-point FFT blocks. The FFT calculating unit 240 may configure N sampled data sequences of each decimation block as inputs for FFT calculation. In an example, if a FFT calculation is performed on K blocks, K data blocks may be outputted. Each of K data blocks may be configured with N frequency domains.

In another example embodiment of the present invention, referring to FIG. 2, each of the K data blocks may have a phase difference. In order to compensate for this phase difference, a phase compensator may be included in the FFT calculating unit 240. The FFT calculating unit 240 may also include a FFT mixer to add phase compensated data based on a sample region. An example embodiment of the FFT calculating unit 240 including the phase compensator and FFT mixer will be described in greater detail later with respect to FIG. 4.

In the example embodiment of FIG. 2, the parallel-to-serial (P/S) converter 250 may re-arrange N parallel data mixed in the FFT calculating unit 240 into a serial data sequence. The P/S converter may then output the converted serial data sequence.

In the example embodiment of FIG. 2, the over-sampling coefficient K may be an integer determined based on frequency characteristics and/or other system performance characteristics, such as an impulse response time of the digital filter.

In the example embodiment of FIG. 2, the receiver 200 may magnify an output power of the FFT output data K times by performing an over-sampling operation K times. Further, noise may not be significantly increased because AWGN having a reduced magnetic correlativity may be generated, even though the phase may be compensated for. Accordingly, a signal-to-noise ratio (SNR) in the receiver 200 may be increased as compared to conventional receivers.

FIG. 3 is a timing diagram illustrating data sequences sampled by the ADC 210 of FIG. 2 based on the Nyquist frequency rate and the over-sampling coefficient K according to another example embodiment of the present invention.

In the example embodiment of FIG. 3, a sample sequence (a) may denote a data sequence sampled based on a conventional Nyquist frequency and a sample sequence (b) may denote a data sequence generated by performing an over-sampling in accordance with another example embodiment of the present invention. As discussed above, the sample sequence (b) may be divided and outputted from a serial-to-parallel (S/P) converter (e.g., S/P converter 230) to K N-point FFT calculating units (e.g., FFT calculating unit 240).

Figure 4:
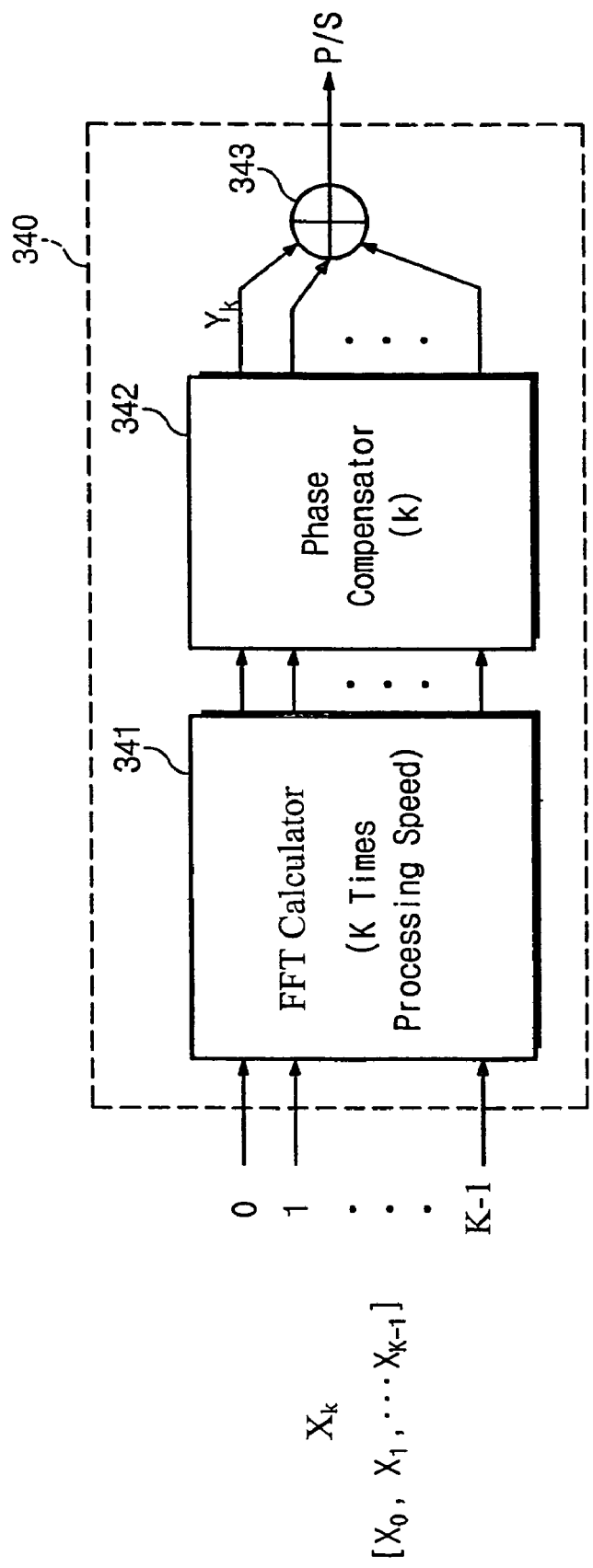
FIG. 4 is a block diagram illustrating a Fast Fourier Transform (FFT) calculating unit 340 according to another example embodiment of the present invention.

FIG. 4 is a block diagram illustrating a FFT calculating unit 340 according to another example embodiment of the present invention. In an example, the FFT calculating unit 240 of FIG. 4 may be representative of the FFT calculating unit 240 of FIG. 2.

In the example embodiment of FIG. 4, the FFT calculating unit 340 may include K FFT calculators 341 arranged in parallel, K phase compensators 342 arranged in parallel connected to corresponding members of the K FFT calculators 341 and a FFT mixer 343. In an example, the serial-to-parallel (S/P) converter 230 of FIG. 2 may divide K×N data into the K N-point FFT data blocks. The K FFT calculators 341 may receive the K N-point FFT data blocks from the serial-to-parallel (S/P) converter 230 of FIG. 2. The K phase compensators 342 may receive the outputs of the FFT calculators 341 and may compensate the received outputs for phase variations (e.g., generated by a time delay of each decimation block during the over-sampling). The FFT mixer 343 may add (e.g., combine) the phase compensated FFT data outputted from the K phase compensators 342.

In the example embodiment of FIG. 4, the FFT calculating unit 340 may include K N-point decimation FFT calculators 341 which may be arranged in parallel. Input data sequences $X_k$ of each N-point decimation FFT calculator 341 may be expressed as $$X_0 = [X_{(0)}, X_{(K)}, X_{(2K)}, \ldots, X_{[(N-1)K]}]$$
$$X_1 = [X_{(1)}, X_{(K+1)}, X_{(2K+1)}, \ldots, X_{[(N-1)K+1]}]$$
$$X_2 = [X_{(2)}, X_{(K+2)}, X_{(2K+2)}, \ldots, X_{[(N-1)K+2]}]$$
$$\vdots \qquad \vdots$$
$$X_{K-1} = [X_{(K-1)}, X_{(2K-1)}, X_{(3K-1)}, \ldots, X_{[NK-1]}]$$

Equation 1 where $X_1$ may denote a data sequence obtained by delaying $X_0$ for a sample ($T_s/NK$), $X_2$ may denote a data sequence obtained by delaying $X_0$ for two samples ($2T_s/NK$), and so on. As shown in FIG. 4, N-point FFT may be performed on each of the K FFT input blocks expressed above in Equation 1 to generate N frequency domain data sequences in parallel. The output data sequences $Y_K$ may be expressed as $$Y_0 = FFT[X_0]$$
$$Y_1 = FFT[X_1]$$
$$Y_2 = FFT[X_2]$$
$$\vdots \qquad \vdots$$
$$Y_{K-1} = FFT[X_{K-1}]$$

Equation 2 where each of the FFT outputs may be expressed as $$Y_0(m) = Y_0(m)$$
$$Y_1(m) = Y_0(m) \times \exp\left\{\frac{(j2\pi m)}{(K \times N)}\right\}$$
$$Y_2(m) = Y_0(m) \times \exp\left\{\frac{(j2\pi m) \times 2}{K \times N}\right\}$$
$$\vdots \qquad \vdots$$
$$Y_{K-1}(m) = Y_0(m) \times \exp\left\{\frac{j2\pi m \times (K-1)}{(K \times N)}\right\},$$
$$\text{wherein } m = -\frac{N}{2}, -\frac{N}{2}+1, \ldots, \frac{N}{2}-1$$

Equation 3 where m may denote a sub carrier wave coefficient, and a phase variation may reach as much as $exp(j2\pi m/NK)$, the delay generated by a time delay between decimation blocks during over-sampling.

In the example embodiment of FIG. 4, the phase compensators 342 may be configured to compensate for phase variations of the K decimation blocks described above with respect to FIG. 3. In order to compensate the phase variations, the data Yk outputted from the FFT calculators 341 may be multiplied with elements in Equation 4 (below) for compensating for the phase delay for each of the sub-carrier wave elements.

$$\theta_k(m) = \exp\left(\frac{-j2\pi mk}{N \times K}\right),$$ Equation 4 wherein $m = -\frac{N}{2}, -\frac{N}{2}+1, \ldots, \frac{N}{2}-1$.

Figure 5:
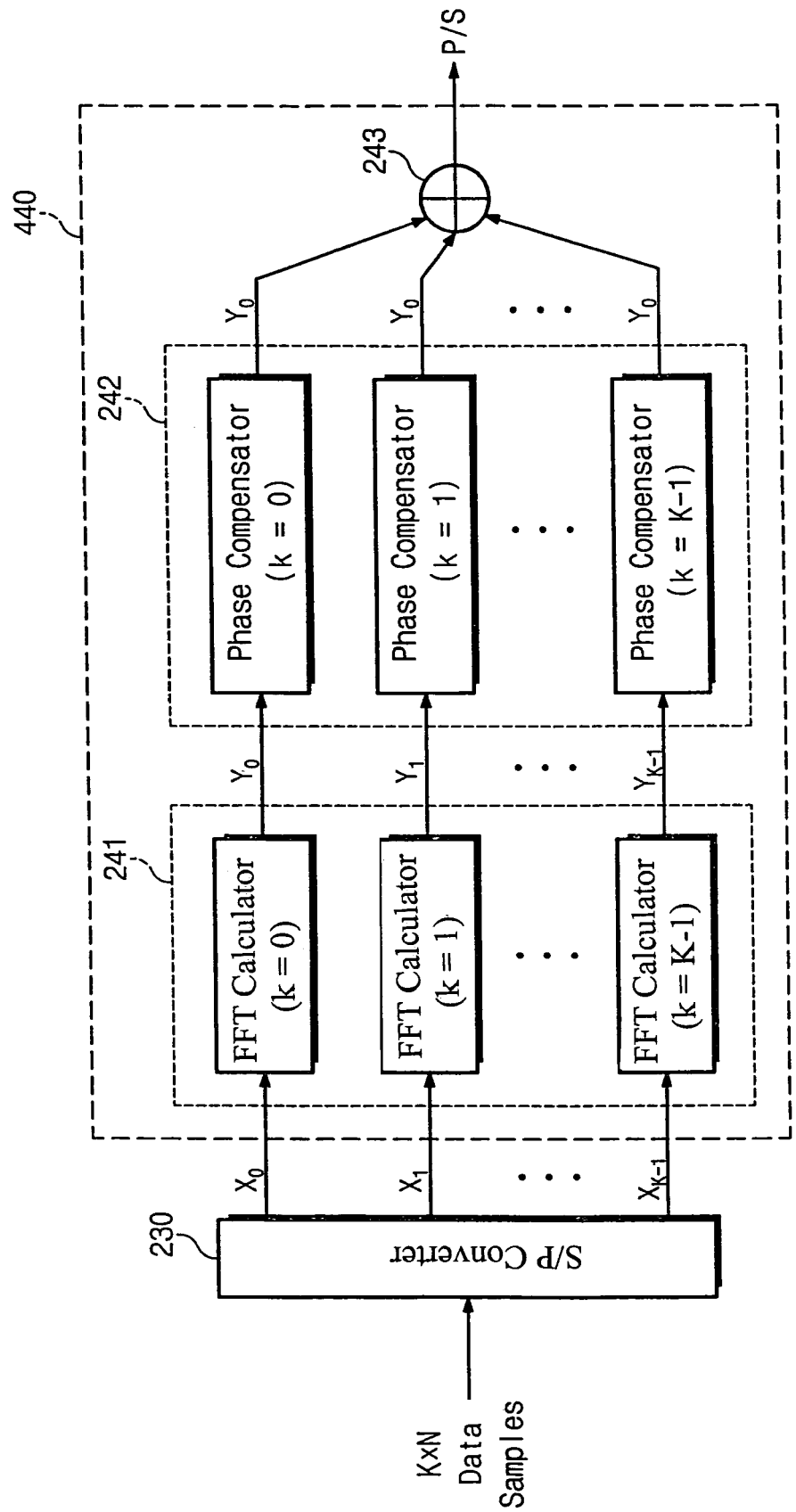
FIG. 5 is a block diagram illustrating a FFT calculating unit according to another example embodiment of the present invention.

FIG. 5 is a block diagram illustrating a FFT calculating unit 440 according to another example embodiment of the present invention. In an example, the FFT calculating unit 440 of FIG. 5 may be representative of the FFT calculating unit 340 of FIG. 4 and/or the FFT calculating unit 240 of FIG. 2.

In the example embodiment of FIG. 5, the FFT calculating unit 440 may include a plurality of FFT calculators 241, a plurality of phase compensators 242 and a FFT mixer 243. The FFT calculating unit 440 may further be shown receiving information from the S/P converter 230 of FIG. 2. The K phase compensators 242 may multiply N sub-carrier wave elements outputted from FFT calculators 241 with a reverse phase, for examples ranging as much as the phase variations described above with respect to FIG. 4. The K phase compensators 242 may output time domain data generated by the FFT calculation with reduced phase delays. Thus, the output data generated by compensating the phase variation for K decimation blocks may have K identical or substantially similar output data.

In the example embodiment of FIG. 5, the FFT mixer 243 may combine the K phase compensated output data from the K phase compensators 242 and may generate an average value of the phase compensated output data. The FFT mixer 243 may output the average value of the phase compensated output data to the P/S converter 250.

FIG. 6 is a block diagram illustrating a FFT calculating unit 640 according to another embodiment of the present invention. In an example, the FFT calculating unit 640 of FIG. 6 may be representative of the FFT calculating unit 240 of FIG. 2.

In the example embodiment of FIG. 6, the FFT calculating unit 640 of FIG. 6 may include fewer structural elements as compared to the FFT calculating units 340 and 440 of FIGS. 4 and 5, respectively. The FFT calculating unit 640 may employ higher-speed FFT calculation for processing information in serial (e.g., in contrast to the FFT calculating units 340/440 which may process information in parallel with lower-speed FFT calculators). As such, it will be appreciated that the S/P converter 230 and P/S converter 250 illustrated in FIG. 2 need not be included for in the example embodiment where the FFT calculations may be performed in serial. The FFT calculating unit 640 of FIG. 6 may be functionally equivalent to the FFT calculating units 240/340/440 and as such will not be described further for the sake of brevity.

In another example embodiment of the present invention, returning to FIG. 2, an input signal x(t) of the ADC 210 may be expressed as $$x(t) = s(t) + w(t)$$ Equation 5 where s(t) may denote a transmitting signal and w(t) may denote an Additive White Gaussian Noise (AWGN).

After performing a sampling on the input signal x(t) based on a Nyquist frequency and performing an FFT calculation on sampled data, the resultant data of the FFT calculation may be expressed as $$X_0 = S + W$$ Equation 6 where S may denote FFT[s(t)] (S=FFT[s(t)]) and W may denote FFT[w(t)] (W=FFT[w(t)]).

In another example embodiment of the present invention, if the K times over-sampling operation is performed on the input signal as described with respect to Equation 5, the over-sampled signal may have K times a number of signal elements with a phase delay as much as a time delay, incurred during the over-sampling operation, and AWGN elements having a same order (e.g., an equivalent amount of noise) as signal elements generated by the FFT calculation. Accordingly, the over-sampled signal having the phase delay may be compensated by "rotating" an output complex data sequence into an opposite direction from a polar coordinate by as much as the phase variation generated by the time delay. As a result of the compensating operation, the FFT calculation blocks may output a set of signals for the transmitting signal S and AWGN elements having the same order to S in the output data from each of the FFT calculators. Thereby, since the AWGN having the same order to the transmitting signal S may not have correlativity, there may be a reduced noise level variation. The result of the FFT calculation described above may be expressed as $$Y = \frac{X_0 + X_1 + \ldots + X_{K-1}}{K}$$ Equation 7

$$= \frac{S \times K + W_0 + W_1 + \ldots + W_{K-1}}{K}$$

In another example embodiment of the present invention, as described above with respect to FIGS. 4 and 5, the output data of the FFT calculators 241/341 may be compensated by the phase compensators 242/342 and then combined (e.g., at FFT mixer 243/343). Accordingly, a power of the transmitting signal S may increase. However, since phase compensated noises may not have magnetic correlativity, an average noise level (e.g., noise across the whole spectrum) may not be varied because of AWGN characteristics. A signal-to-noise ratio (SNR) of the calculation result of Equation 7 may be expressed as $$SNR = \frac{K\sigma_S^2}{\sigma_{w0}^2 + \sigma_{w1}^2 + \sigma_{w2}^2 + \ldots + \sigma_{wK-1}^2}$$ Equation 8

In the example embodiment of Equation 8 (above), output data of over-sampling may be less influenced by noises of a channel and a digital filter and an amount of noise variation may decrease proportionally (e.g., scaling with a value of the over-sampling coefficient K) compared to output data of conventional sampling techniques.

The above-described example relationships may be achieved under an assumption that the frequency characteristics of the digital filter may have conditions similar to those of a sampling frequency. Thus, if a conventional digital filter is used, the SNR improvements described with respect to Equation 8 may be reduced by as much as a cut-off frequency of the digital filter. The quantization noises generated from the digital data outputted from the ADC 210 may be treated as AWGN generated after decimation. Therefore, the quantization noises may be reduced (1/K) times (e.g., in average), and the SNR may thereby increase. It is understood that increasing the SNR may increase an entire system performance.

In another example embodiment of the present invention, a receiver may over-sample (e.g., sample a signal K times in parallel) a signal so as to reduce a noise level in a receiving signal (e.g., an OFDM receiving signal). The burden conventionally put upon a digital filter to suppress noise may thereby be reduced because the noise suppression may be performed via the over-sampling operation. Thus, a reduced number of delay taps may be employed within the digital filter, which may likewise improve a channel impulse response.

Example embodiments of the present invention being thus described, it will be obvious that the same may be varied in many ways. For example, while the above-described example embodiments of the present invention are directed generally to reducing noise in an OFDM receiver, it is understood that other example embodiments of the present invention may be directed to reducing noise in any type of receiver.

Such variations are not to be regarded as a departure from the spirit and scope of example embodiments of the present invention, and all such modifications as would be obvious to one skilled in the art are intended to be included within the scope of the following claims.

What is claimed is:

1. A receiver, comprising:
    an analog-to-digital converter (ADC) for performing an over-sampling operation on a received signal to generate output data, the over-sampling operation based on a sampling frequency and an over-sampling coefficient, wherein the over-sampling coefficient is determined by an input unit; and
    a fast Fourier transform (FFT) calculating unit for performing a FFT operation on the output data of the ADC.

2. The receiver of claim 1, wherein the received signal is an analog signal.

3. The receiver of claim 1, wherein the sampling frequency is a Nyquist sampling frequency.

4. The receiver of claim 1, wherein the receiver is included in an orthogonal frequency division multiplexing (OFDM) system.

5. The receiver of claim 1, wherein the output data is a plurality of phase-shifted versions of the received signal.

6. The receiver of claim 1, wherein the FFT calculating unit comprises:
    at least one FFT calculator that performs the FFT operation on the output data; and
    at least one phase compensating unit that compensates a phase variation of the output data based on the over-sampling coefficient.

7. The receiver of claim 1, wherein the ADC is a variable frequency ADC.

8. The receiver of claim 1, wherein the over-sampling coefficient is a positive integer greater than or equal to 1.

9. The receiver of claim 1, wherein the FFT calculating unit operates at a processing speed that scales with the over-sampling coefficient.

10. The receiver of claim 1, wherein a phase variation of the output data is a phase difference, in a frequency domain, based on a time delay of the output data.

11. The receiver of claim 6, further comprising:
    a mixer that mixes phase compensated data sequences received from at least one phase compensating unit and outputs a data sequence based on the mixed phase compensated data sequences.

12. The receiver of claim 1, wherein the output data of the ADC is configured with data blocks that are equal in number to the over-sampling coefficient, and
    wherein each of the data blocks is arranged in parallel and separated by a time interval based on the sampling frequency.

13. The receiver of claim 1, wherein the FET calculating unit includes a plurality of lower-speed FFT calculators, and
    wherein each of the plurality of lower-speed FFT calculators receives a portion of the output data from the ADC and performs a FFT operation on the received portion.

14. The receiver of claim 13, wherein a number of lower-speed FFT calculators equals the over-sampling coefficient.

15. The receiver of claim 13, wherein the FFT operations are performed by the plurality of lower-speed FFT calculators concurrently on each of the received portions of the output data.

16. The receiver of claim 1, wherein the FFT calculating unit comprises a higher-speed FFT calculator, and
    wherein the higher-speed FFT calculator receives the output data from the ADC and performs a EFT operation on a received portion of the output data.

17. The receiver of claim 16, wherein the higher-speed FFT calculator is the only FFT calculator in the FFT calculating unit, and
    wherein the higher-speed FFT calculator serially processes received portions of the output data.

18. A method for receiving data, comprising:
    determining an over-sampling coefficient;
    over-sampling a received signal based on the over-sampling coefficient and a sampling frequency to generate over-sampled data; and
    performing a fast Fourier transform (FFT) operation on the over-sampled data to generate FFT over-sampled data.

19. The method of claim 18, further comprising:
    compensating for phase shifts in the EFT over-sampled data based on the over-sampling coefficient; and
    combining the compensated FFT over-sampled data to generate an output signal.

20. The method of claim 19, wherein the output signal is a demodulated signal with an improved signal-to-noise (SNR) ratio.

21. The method of claim 18, wherein the over-sampling coefficient is a positive integer greater than or equal to 1.

22. The method of claim 18, wherein the EFT operation is performed at a processing speed that scales with the over-sampling coefficient.

23. The method of claim 18, wherein performing the FFT operation generates phase shifts in the FFT over-sampled data.

24. A method of receiving data with the receiver of claim 1.

* * * * *